United States Patent [19]
Manukyan

[11] Patent Number: 5,971,206
[45] Date of Patent: Oct. 26, 1999

[54] CLIP DISPENSING DEVICE

[75] Inventor: Manuk Manukyan, 6-13, Paronyan Street, Yerevan, 375015, Armenia

[73] Assignees: George K. Najarian, Lincoln, Mass.; Manuk Manukyan, Yerevan, Armenia

[21] Appl. No.: 08/891,795

[22] Filed: Jul. 15, 1997

[51] Int. Cl.[6] .............................. B65H 1/08; B65G 59/00
[52] U.S. Cl. .......................... 221/232; 221/226; 221/268; 221/276
[58] Field of Search .................................... 221/232, 226, 221/268, 276

[56] References Cited

U.S. PATENT DOCUMENTS

| | | | |
|---|---|---|---|
| 2,250,303 | 7/1941 | Katz | 221/232 |
| 2,340,894 | 2/1944 | Morrell | 221/232 |
| 2,383,207 | 8/1945 | Morrell | 221/232 |
| 2,423,788 | 7/1947 | Muller-Molnar | 221/232 |
| 2,562,414 | 7/1951 | Cardella et al. | 221/232 |
| 2,633,138 | 3/1953 | Belisle et al. | 221/232 |
| 2,803,378 | 8/1957 | Gundling | 221/232 |
| 2,853,206 | 9/1958 | Uxa | 221/276 |
| 3,324,538 | 6/1967 | Christensen | 221/232 |
| 3,578,207 | 5/1971 | Danow | 221/232 |
| 4,471,885 | 9/1984 | Mucciarone | 221/232 |
| 4,770,321 | 9/1988 | Anderson | 221/232 |
| 4,910,646 | 3/1990 | Kim | 221/276 |
| 5,474,222 | 12/1995 | Kanai et al. | 227/131 |

FOREIGN PATENT DOCUMENTS

N2048064  6/1991  Russian Federation .

*Primary Examiner*—William E. Terrell
*Assistant Examiner*—Wonki K. Park
*Attorney, Agent, or Firm*—Oliff & Berridge, PLC

[57] ABSTRACT

A clip dispensing device has a dispenser body and a magazine inside the body for storage of a stack of clips. The magazine includes an outlet end adjacent a front end of the body, a biased platform for bearing on the last clip in the stack of clips and urging the first clip in the stack of clips against the outlet end of the magazine and an outlet groove at the outlet end of the magazine for dispensing clips from the magazine. A presser is movably attached to the body for reciprocating movement in a clip ejection direction and a withdrawal direction. A pusher is connected to the presser for reciprocating movement with the presser. The pusher reciprocates within a pusher groove communicating with the magazine through a pusher slot located in the body. A tongue having a size smaller than the pusher slot is pivotally attached to the pusher at a first end of the tongue. A second end of the tongue engages the first clip. When the presser is moved in the clip ejection direction, the pusher moves within the pusher groove toward the magazine and the second end of the tongue pivots through the pusher slot to engage the first clip in the stack of clips and push the first clip through the outlet groove. The tongue retracts through the pusher slot into the pusher groove when the pusher and presser move in the withdrawal direction. With this construction, the biasing force of the clips does not bear against the torque or pusher, so that the presser easily retracts in the withdrawal direction.

23 Claims, 11 Drawing Sheets

CLIP DISPENSING DEVICE

BACKGROUND OF THE INVENTION

1. Field of the Invention

This invention relates to a device to dispense clips for clipping plants or vines to a trellis wire.

2. Description of Related Art

In the growing of plants with vines or stems, it is desirable to support the vines or stems, so as to maximize the growth potential of the plants. There exists equipment for manual attachment of plants to a trellis wire which involves multiple steps or operations. These multiple steps or operations are time consuming.

It is also necessary to remove the clip or other means of attachment after a certain growth has occurred or time has passed. Many of the existing forms of manual attachment require labor-intensive and costly procedures to remove the attachment.

Russian Patent No. 2,048,064 discloses a device designed to overcome these problems with the prior methods of attaching a vine or stem to a trellis wire. Referring to FIGS. 11 and 12, Russian Patent No. 2,048,064 discloses a device consisting of body 102, handle 105, dispenser 106 which holds stack of clips 103, spring 114 urging the stack of clips toward the top of the dispenser, exit grooves 118 located at the top of the dispenser adjacent the uppermost clip of the stack of clips, and pusher 110 for pushing the uppermost clip through exit grooves 118 and out of the device. Arm 108 attached to handle 105 meshes with notch 109 in pusher 110 so that when handle 105 is depressed, arm 108 pushes pusher 110 by way of notch 109 and moves pusher 110 toward exit grooves 118. In moving toward exit grooves 118, pusher 110 contacts the end of the uppermost clip of the stack of clips and pushes the clip out of exit grooves 118.

The structure of the device of the Russian patent creates a problem in that after a clip has been dispensed, the new uppermost clip is pushed against the bottom side of pusher 110 by spring 114 which urges the stack of clips upward, thus creating a frictional force between the uppermost clip and pusher 110. This frictional force prevents pusher 110 from smoothly and easily retracting to its initial position ready to dispense another clip.

SUMMARY OF THE INVENTION

The purpose of the invention disclosed by this application is to provide a clipping device which overcomes the above stated problem.

This invention provides a clip dispensing device having a dispenser body defining a longitudinal direction and having a front end and a back end. A magazine is provided inside the body for storage of a stack of clips. The magazine includes: an outlet end adjacent the front end of the body; a biased platform for bearing on the last clip in the stack of clips and urging the first clip in the stack of clips against the outlet end of the magazine; and an outlet groove at the outlet end of the magazine for dispensing clips from the magazine. A presser is movably attached to the body for reciprocating movement in a clip ejection direction transverse to the longitudinal direction and a withdrawal direction opposite the clip ejection direction. A pusher is located within the body and is connected to the presser for reciprocating movement with the presser in the clip ejection and withdrawal directions. The pusher reciprocates within a pusher groove formed within the body and communicating with the outlet end of the magazine through a pusher slot located at the front end of the body. A tongue having a size smaller than the pusher slot is moveably attached to the pusher at a first end of the tongue. A second end of the tongue engages the first clip in the stack of clips.

When the presser is moved in the clip ejection direction, the pusher moves within the pusher groove toward the magazine and the second end of the tongue pivots out of the pusher slot to engage the first clip in the stack of clips and push the first clip through the outlet groove of the magazine. The tongue retracts into the pusher slot when the pusher and presser move in the withdrawal direction. With this construction, the biasing force of the clips does not bear against the tongue or pusher, so that the presser easily retracts in the withdrawal direction.

One type of clip which can be used by the clip dispensing device according to this invention is a C-shaped flexible plastic clip having opposite ends which touch each other but are not connected to each other, and a center open area for containing the articles to be clipped together.

BRIEF DESCRIPTION OF THE DRAWINGS

Other advantages and salient features of the clip dispensing devices according to this invention will become apparent from the following disclosure taken in conjunction with the following drawings wherein.

DETAILED DESCRIPTION OF PREFERRED EMBODIMENTS

Figure 8:
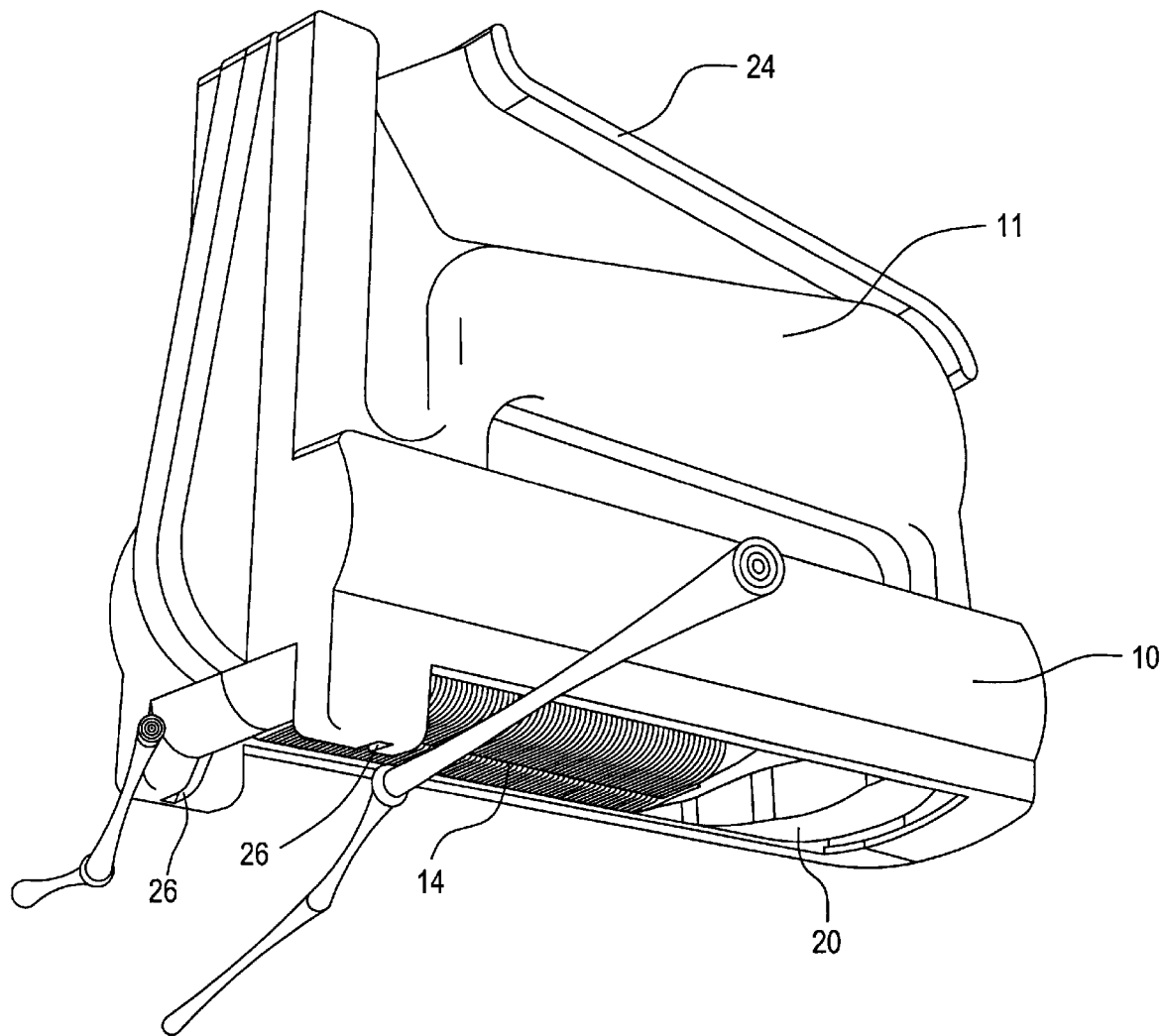
FIG. 8 is a perspective view of the clip dispensing device of FIGS. 1–7 prior to clipping two vines.
Figure 9:
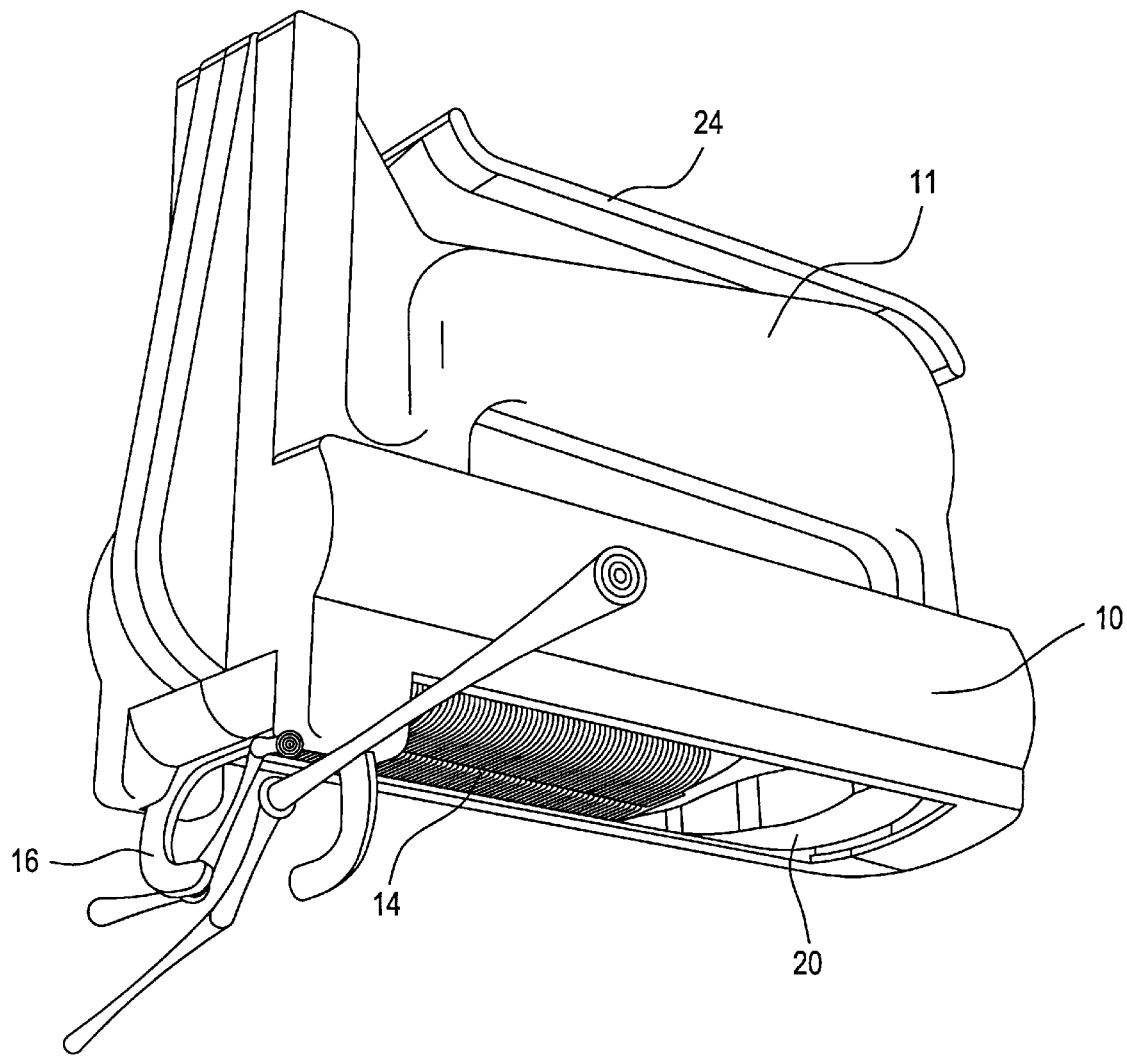
FIG. 9 is a perspective view of the clip dispensing device of FIGS. 1–8 showing a clip being dispensed around two vines.
Figure 10:
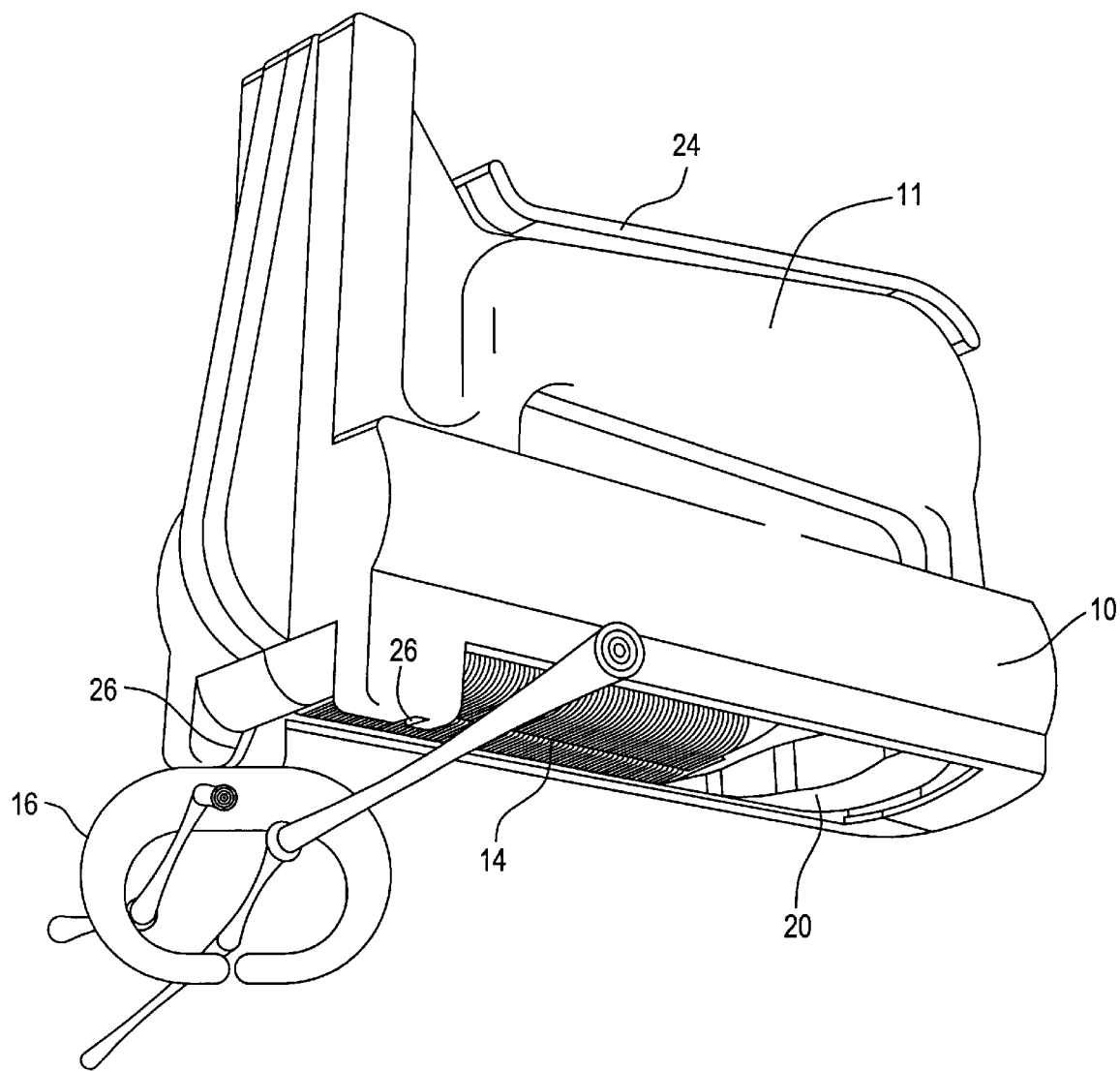
FIG. 10 is a perspective view of the clip dispensing device of FIGS. 1–9 with the clip fully removed from the clip dispensing device after two vines have been clipped.
Figure 11:
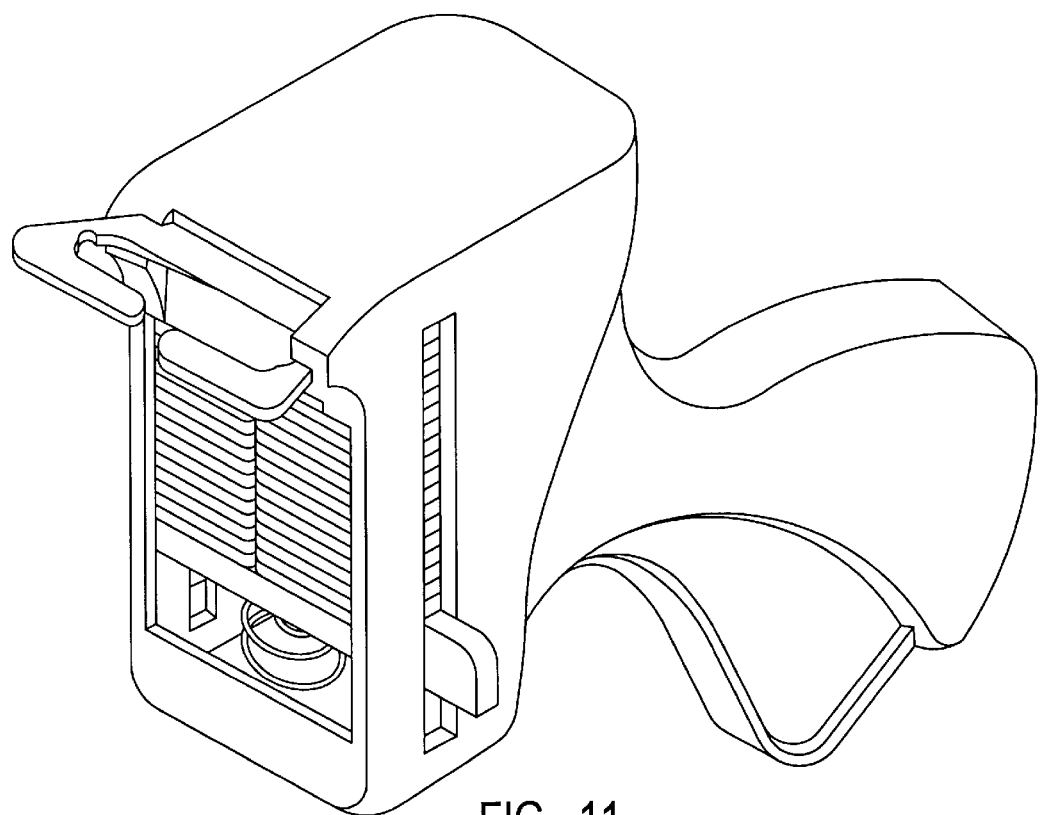
FIG. 11 is a perspective view of a conventional clip dispensing device.
Figure 12:
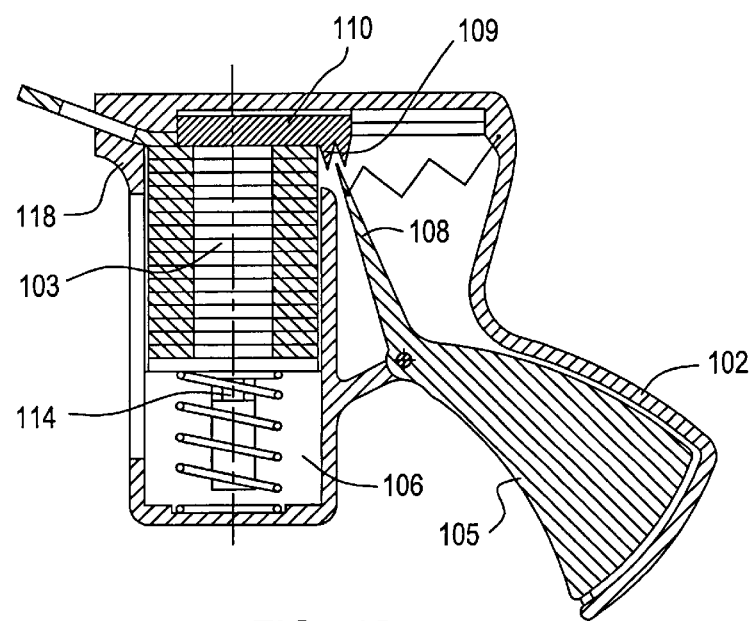
FIG. 12 is a sectional view of a conventional clip dispensing device.

The clip dispensing device of applicant's invention ejects clips for the purpose of clipping vines and the like to wires or trellises, for example. As shown in FIGS. 8–10, while a clip is ejected from the device, the opposite ends of the clip are spread apart such that the vine and the wire, for example, can be inserted into the void area of the center of the clip. As the clip is pulled from the device, the ends of the clip return to their original relative positions such that the vines, etc., are contained within the void area of the center of the clip. The structure of the device eliminates the problems of the prior art. A detailed description of the preferred embodiments of the device will now be presented.

Figure 1:
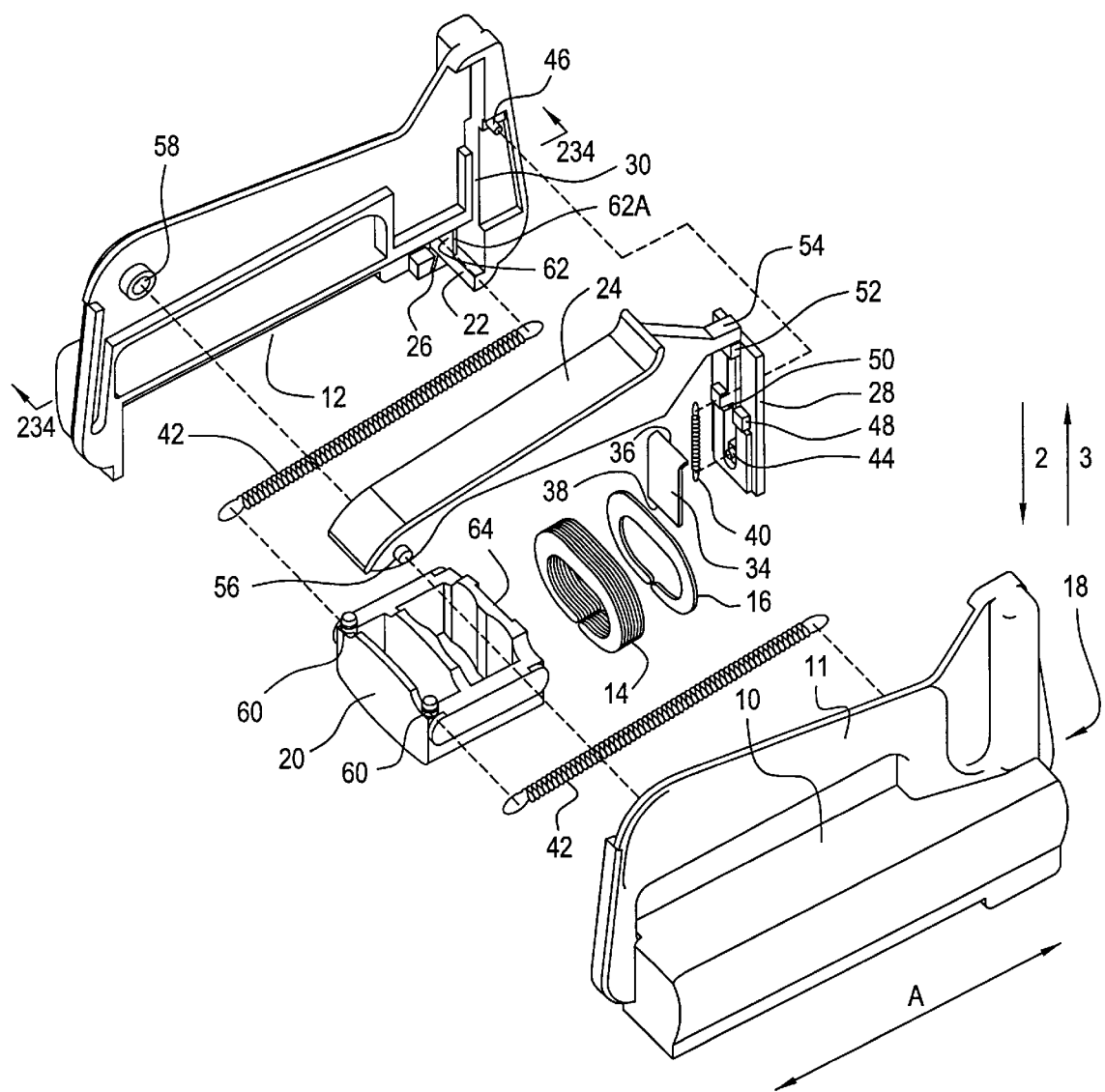
FIG. 1 is an exploded perspective view of a clip dispensing device of the invention.

As shown in FIG. 1, the clip dispensing device has body 10 which includes handle 11 and magazine 12. Body 10 is preferably molded from plastic in two substantially symmetrical halves but can be made from any suitable material. Magazine 12 is a void area in the lower side of body 10 which is open to the bottom and is enclosed by body 10 at the top, sides and ends. The ends of magazine 12 are parallel to each other and perpendicular to the longitudinal axis of magazine 12. Outlet end 22 of magazine 12 is the end of magazine 12 nearest front end 18 of body 10 and is defined by end wall 62. Magazine 12 is used to store a series, or stack, of clips 14 including first clip 16.

It is noted that the structure illustrated in the left or upper half of body 10 in FIG. 1 is mirrored in the right or lower half of body 10 in FIG. 1. Therefore, the end wall 62 is formed in both halves of the body 10 when assembled together. Other structures will be described below with reference to one of the halves of the body 10, but one skilled in the art will recognize that the structure also is formed on the other symetrical half.

Platform 20 is located in magazine 12 abutting stack of clips 14 with stack of clips 14 between platform 20 and end wall 62 of magazine 12. The platform rides on rails 66 defined within the halves of the body 10 so as to retain the platform in the magazine. Platform 20 is biased in the direction of end wall 62 by platform springs 42. Platform springs 42 are connected at one end to platform 20 at platform spring hubs 60 and are connected at the other end to body 10. Platform 20 has platform slot 64 in the face of platform 20 that abuts stack of clips 14. For reasons discussed below, platform slot 64 is larger than tongue 34.

Presser 24 is attached to body 10 such that presser end 54 moves in clip ejection direction 2 and withdrawal direction 3 opposite to clip ejection direction 2. Clip ejection direction 2 and withdrawal direction 3 are perpendicular to the longitudinal axis of magazine 12. In a preferred embodiment, presser 24 includes pivot pin 56 and is pivotally attached to at least one pivot recess 58 in body 10.

Pusher 28 is contained within pusher groove 30 in body 10 and slides within pusher groove 30 in clip ejection direction 2 and withdrawal direction 3. Presser end 54 contacts pusher ledge 52 of pusher 28. As presser 24 moves in clip ejection direction 2, presser end 54 pushes pusher 28 in clip ejection direction 2 by way of contact with pusher ledge 52. Pusher 28 is biased in withdrawal direction 3 by pusher spring 40. Pusher spring 40 is connected at one end to pusher spring hub 44 of pusher 28 and is connected at the other end to pusher spring hub 46 of body 10.

Tongue 34 is attached to pusher 28 and moves with pusher 28 in clip ejection direction 2 and withdrawal direction 3. First end 36 of tongue 34 is attached to pusher 28 such that second end 38 of tongue 34 can move in longitudinal direction A relative to pusher 28. Preferably, first end 36 is pivotally attached to pusher 28 so that second end 38 is capable of pivoting away from pusher 28.

In a preferred embodiment, tongue 34 is L-shaped such that first end 36 of tongue 34 fits in tongue notch 50 formed in pusher 28. The upper face of tongue notch 50 is defined by tongue abutments 48 formed in pusher 28. As pusher 28 moves in clip ejection direction 2, tongue abutments 48 contact first end 36 of tongue 34 and push tongue 34 in clip ejection direction 2. As pusher 28 moves in withdrawal direction 3, the lower face of tongue notch 50 contacts first end 36 of tongue 34 and pushes tongue 34 in withdrawal direction 3.

End wall 62 of magazine 12 is connected to pusher groove 30 by pusher slot 32 which is defined by edges 62A in FIG. 1. Pusher slot 32 is a hole in end wall 62 and is larger than tongue 34.

In a preferred embodiment, the depth of pusher slot 32, which is the thickness of end wall 62 in the longitudinal direction of magazine 12, is greater than the thickness of tongue 34.

Referring to FIGS. 2–7, the operation of the clip dispensing device will be described.

Figure 2:
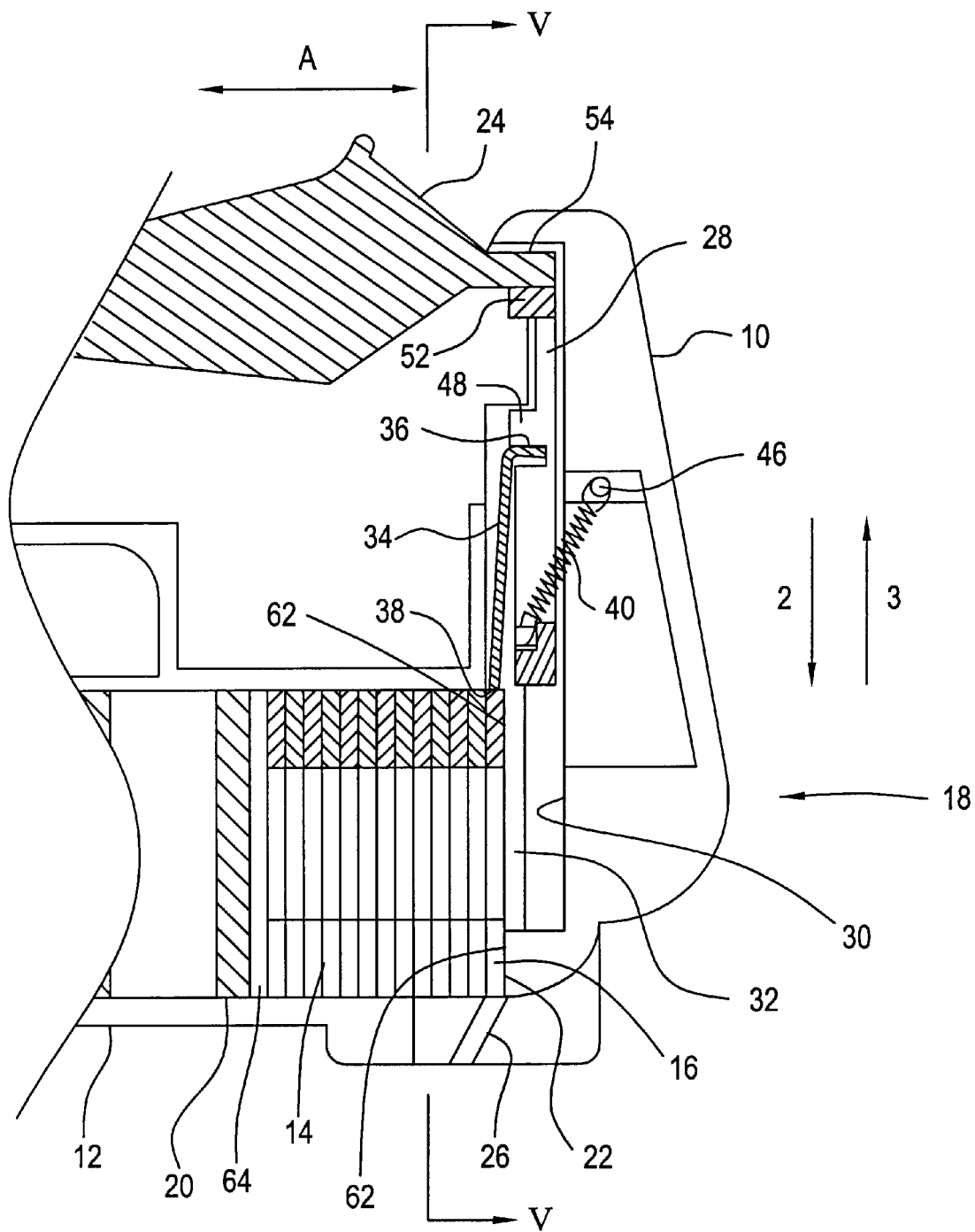
FIG. 2 is a partial sectional view of the clip dispensing device of FIG. 1, taken along section line 234, prior to the dispensing of a clip showing the presser in the non-depressed position.
Figure 5:
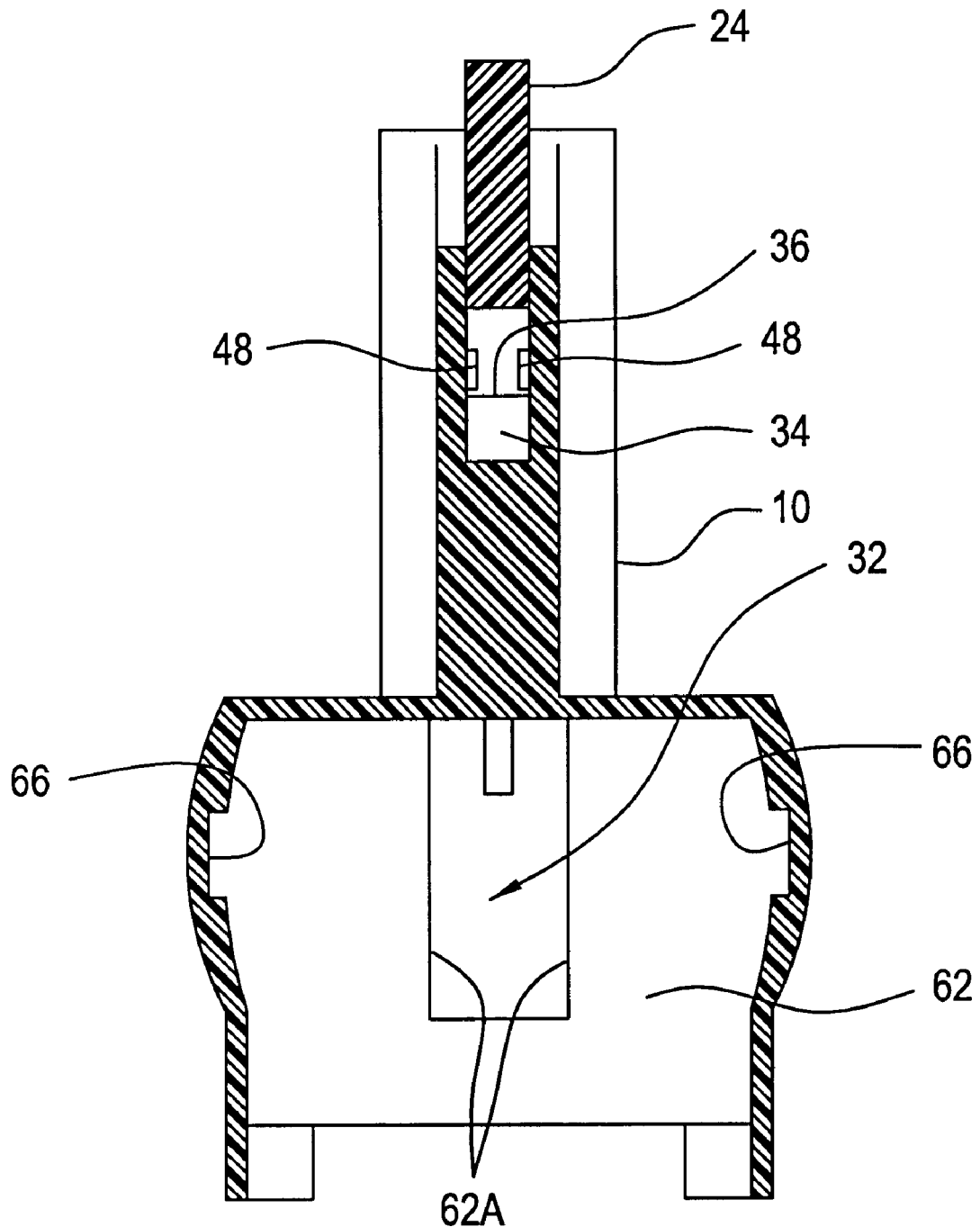
FIG. 5 is a sectional view of the clip dispensing device of FIGS. 1–4 taken along section line V—V of FIG. 2.

FIGS. 2 and 5 show the device in a position ready to dispense first clip 16 from magazine 12. First clip 16 is in contact with end wall 62 of magazine 12 on both sides of pusher slot 32 and is vertically aligned with outlet groove 26 in body 10. Presser 24 and pusher 28 are in their uppermost positions under the urging force of pusher spring 40. Second end 38 of tongue 34 is above the top of first clip 16. Because the device is held by the user with front end 18 of body 10 elevated higher than the other end of body 10, gravity forces second end 38 of tongue 34 out of pusher slot 32 to align with the top of first clip 16. FIG. 8 also shows this state of the device.

Figure 3:
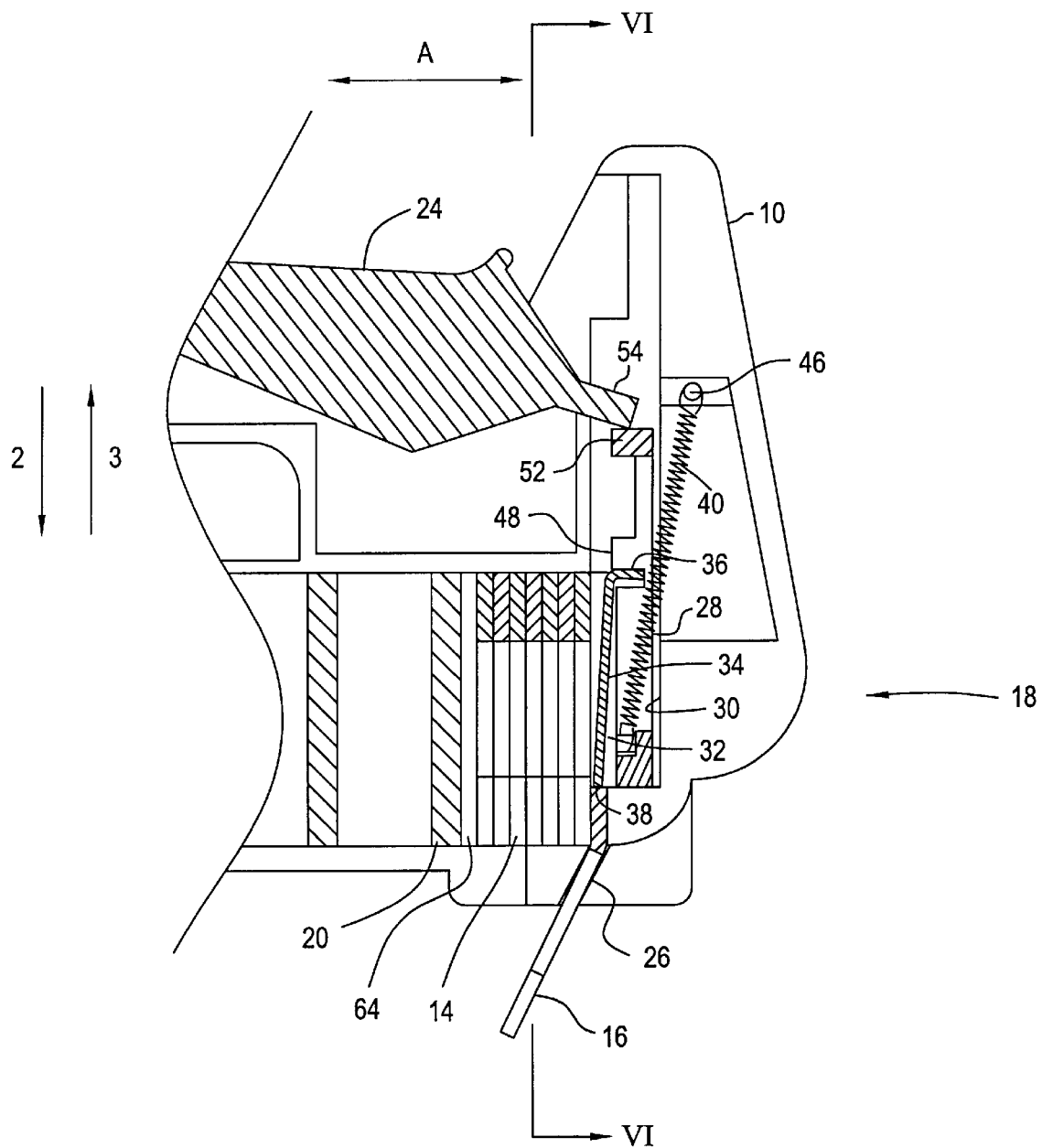
FIG. 3 is a partial sectional view of the clip dispensing device of FIGS. 1 and 2, taken along section line 234, during the dispensing of a clip.
Figure 6:
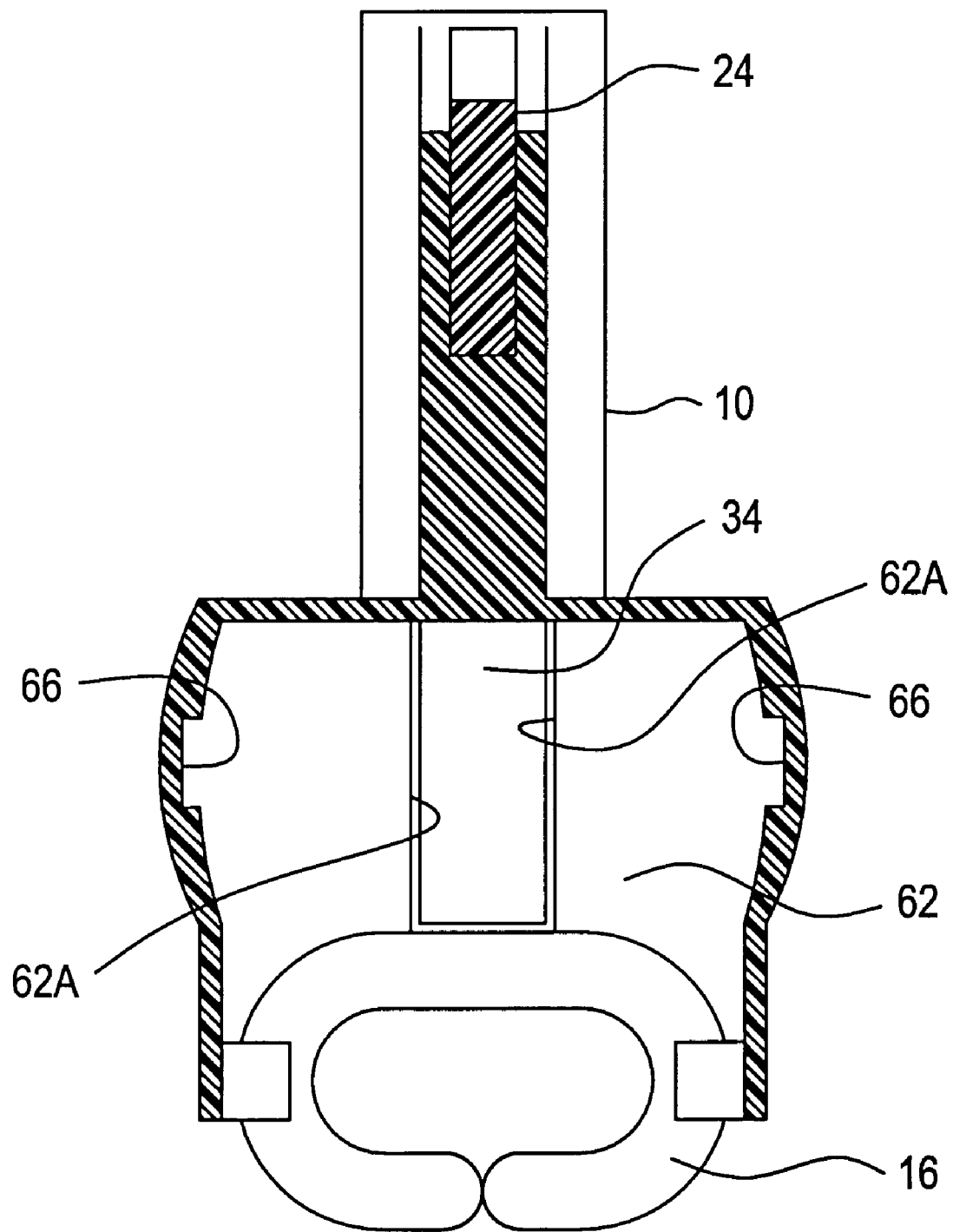
FIG. 6 is a sectional view of the clip dispensing device of FIGS. 1–5 taken along section line VI-VI of FIG. 3.

From the condition shown in FIG. 2, to dispense first clip 16, a user presses presser 24 in clip ejection direction 2. As shown in FIGS. 3 and 6, movement of presser 24 in clip ejection direction 2 pushes pusher 28 in clip ejection direction 2 by contact between presser end 54 and pusher ledge 52. The force of tongue abutments 48 on first end 36 of tongue 34 causes tongue 34 to move in clip ejection direction 2. Second end 38 of tongue 34 engages the top of the first clip 16 and is retained thereon by frictional forces and the compressive force between pusher 28 and first clip 16. First clip 16 is pushed through outlet groove 26 by second end 38 of tongue 34.

One type of clip used with the device is C-shaped with opposite ends touching each other but not attached to each other, and a center open area for containing the articles to be clipped together. For example see clips 14, 16 in FIG. 1. In a preferred embodiment, a first portion of outlet groove 26 (in the left half of body 10 in FIG. 1) angles away from front end 18 of body 10 as it extends in clip ejection direction 2 and a second portion of outlet groove 26 (not shown but in the right half of body 10 in FIG. 1) angles toward front end 18 of body 10 as it extends in clip ejection direction 2. As shown in FIG. 9, this configuration of outlet groove 26 causes the opposite ends of first clip 16 to spread apart from each other, thereby creating an opening into which the two articles to be clipped together can be inserted. Other shapes and directions of outlet groove 26 are appropriate for other applications and other clip types.

FIGS. 3 and 6 show the device in a position in which first clip 16 is being dispensed and presser 24, pusher 28 and tongue 34 are in their lowermost positions. With first clip 16 in this position, the user positions the two articles to be clipped together in the clip as shown in FIG. 9. The user then pulls the device away from the articles being clipped, thereby pulling first clip 16 from outlet groove 26 and completely removing first clip 16 from the device, as shown in FIG. 10.

Figure 4:
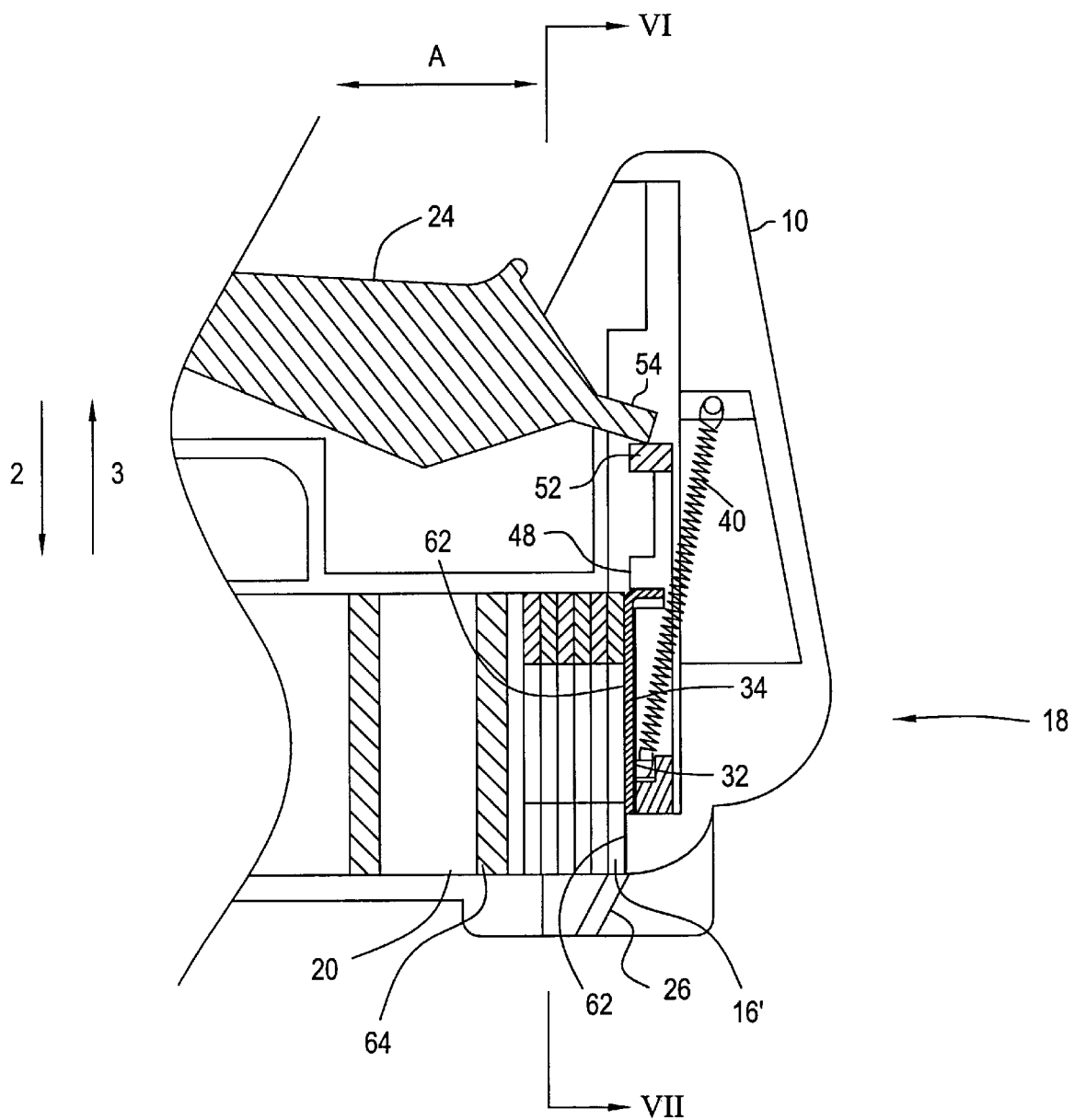
FIG. 4 is a partial sectional view of the clip dispensing device of FIGS. 1–3, taken along section line 234, after the dispensing of a clip showing the tongue in the pusher slot and the presser in the depressed position.
Figure 7:
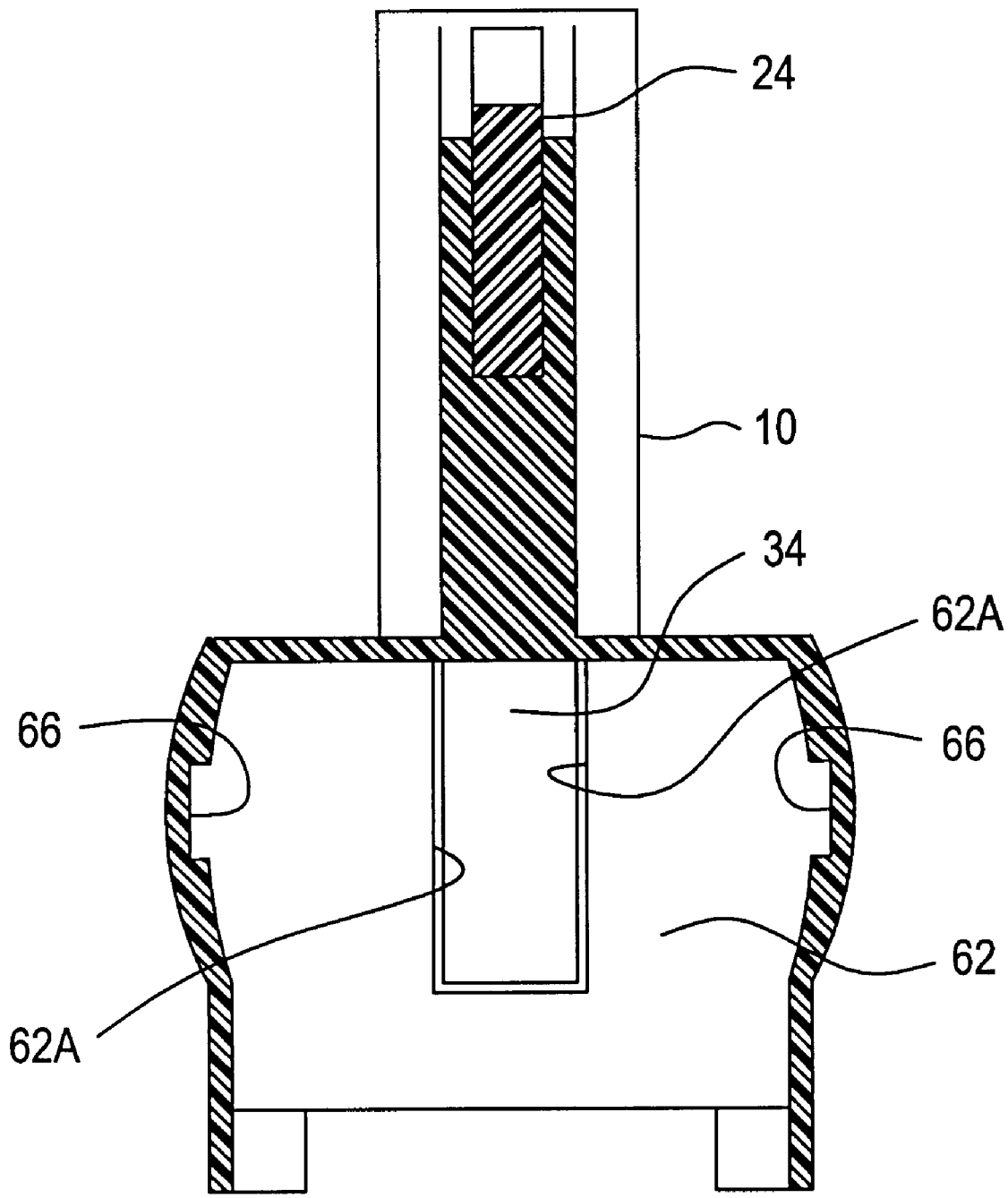
FIG. 7 is a sectional view of the clip dispensing device of FIGS. 1–6 taken along section line VII-VII of FIG. 4.

As shown in FIGS. 4 and 7, after first clip 16 is removed from the device, the stack of clips 14 are pressed toward, and come in contact with, end wall 62 of magazine 12 by the force of platform springs 42 acting through platform 20. Because second end 38 of tongue 34 moves in longitudinal direction A relative to pusher 28, tongue 34 is pushed into pusher slot 32 by new first clip 16'. Because tongue 34 can retract into pusher slot 32, the force of platform springs 42 pushing new first clip 16' toward end wall 62 is counteracted by end wall 62 and not tongue 34. Therefore, no significant frictional force exists between tongue 34 and new first clip 16'.

Because no significant frictional force exists between tongue 34 and new first clip 16', when the user releases presser 24, pusher spring 40 easily returns presser 24, pusher 28 and tongue 34 to the positions shown in FIG. 2. The device is then ready to dispense new first clip 16' and the above process is repeated.

In a preferred embodiment, platform 20 is formed with platform slot 64 in the face of platform 20 closest to end wall 62 of magazine 12. After the last clip in the stack of clips 14 is fully dispensed, platform 20, under the force of platform springs 42, is pushed into contact with end wall 62. After presser 24, pusher 28 and tongue 34 return to the positions shown in FIG. 2, if the user presses presser 24, tongue 34 will not contact the top of platform 20 because tongue 34 can slide in platform slot 64. Therefore, potential damage to the device or the user's hand caused by the user forcing tongue 34 against the top of platform 20 is prevented.

In a preferred embodiment, tongue 34 is made of metal for strength. This improves the durability of tongue 34 in repetitively ejecting the clips. If tongue 34 is made of a soft material such as plastic, tongue 34 could deteriorate over time.

Various modifications, improvements and other embodiments will become apparent to those skilled in the art once given this disclosure. For example, a biasing mechanism could be provided between the tongue and the pusher to force the tongue out of the pusher slot, so that the device need not rely on gravity to move the tongue out of the pusher slot. The device could then be used in any orientation. These and other modifications, improvements and other embodiments are considered to be within the scope of this invention as defined by the following claims.

What is claimed is:

1. A clip dispensing device comprising:
   a dispenser body defining a longitudinal direction and having first and second ends;
   a magazine within the dispenser body for storage of a series of clips, the magazine having: an outlet end adjacent the first end of the body; a biased platform for bearing on a last one of the series of clips and urging a first clip of the series of clips against the outlet end of the magazine; and an outlet groove at the outlet end of the magazine for dispensing clips from the magazine;
   a presser movably attached to the body for reciprocating movement in a clip ejection direction transverse to the longitudinal direction and in a withdrawal direction opposite to the clip ejection direction;
   a pusher located within the body and connected to the presser for reciprocal movement with the presser in the clip ejection and withdrawal directions, the pusher reciprocating within a pusher groove formed within the body and communicating with the outlet end of the magazine through a pusher slot located at the first end of the body; and
   a tongue attached to the pusher and having a size smaller than the pusher slot, the tongue having a first end pivotally attached to the pusher and a second end for engaging the first clip in the series of clips;
   wherein movement of the presser in the clip ejection direction moves the pusher within the pusher groove toward the magazine, and the second end of the tongue pivots out of the pusher slot to engage the first clip in the series of clips and push the first clip through the outlet groove of the magazine, the tongue retracting into the pusher slot when the presser and pusher move in the withdrawal direction.

2. The dispensing device of claim 1, wherein the pusher is biased to urge the presser in the withdrawal direction.

3. The dispensing device of claim 1, wherein the presser has first and second ends, the second end being pivotally attached to the second end of the body and the first end being connected to the pusher at the first end of the body.

4. The dispensing device of claim 1, wherein the pusher groove and the outlet end of the magazine are separated by an end wall within the body, and the pusher slot is located in the end wall.

5. The dispensing device of claim 1, wherein the pusher is spring biased in the withdrawal direction and the platform is spring biased to urge the clips against the outlet end of the magazine, the retraction of the tongue within the pusher slot preventing the series of clips from binding against the pusher when the pusher moves in the withdrawal direction.

6. The dispensing device of claim 1, wherein the tongue is metal and the pusher and clips are plastic.

7. The dispensing device of claim 1, wherein the outlet groove has first and second portions, the first portion being angled toward the first end of the body.

8. The dispensing device of claim 7, wherein the second portion is angled toward the second end of the body.

9. The dispensing device of claim 1, wherein the outlet groove has first and second portions, the second portion being angled toward the second end of the body.

10. The dispensing device of claim 1, wherein the biased platform comprises:
    an end face adjacent the outlet end of the magazine; and
    a platform slot in the end face and having a size larger than the tongue;
    wherein when the biased platform contacts the outlet end of the magazine, the tongue moves within the platform slot to allow movement of the presser in the clip ejection direction.

11. A clip dispensing device comprising
    a dispenser body defining a longitudinal direction and having first and second ends;
    a magazine within the dispenser body for storage of a series of clips, the magazine having: an outlet end adjacent the first end of the body; a platform biased by a first spring for bearing against a last clip in the series of clips and urging a first clip of the series of clips against the outlet end of the magazine; and an outlet groove at the outlet end of the magazine for dispensing clips from the magazine;
    a presser movably attached to the body for reciprocating movement in a clip ejection direction transverse to the longitudinal direction and in a withdrawal direction opposite to the clip ejection direction;
    a pusher located within the body and connected to the presser for reciprocal movement with the presser in the clip ejection and withdrawal directions, the pusher being biased in the withdrawal direction by a second spring, the pusher reciprocating in a pusher groove separated from the outlet end of the magazine by a wall; and a tongue on the pusher entering the outlet end of the magazine to engage and eject clips from the magazine when the pusher moves in the clip ejection direction, and retracting from the outlet end of the magazine and into the pusher groove when the pusher moves in the withdrawal direction;

wherein the wall prevents interference between an urging force of the first spring and a withdrawal force of the second spring.

12. The dispensing device of claim 11, wherein: the wall includes a pusher slot having a size larger than the tongue; the tongue is pivotally attached to the pusher; and the tongue protects out of the pusher slot when the presser moves in the clip ejection direction, the tongue retracting into the pusher slot when the presser moves in the withdrawal direction.

13. The dispensing device of claim 11, wherein the platform comprises a platform slot having a size larger than the tongue and allowing movement of the tongue in the clip ejection and withdrawal directions when the platform contacts the wall.

14. A clip dispensing device for dispensing clips, the clip dispensing device comprising:

a body;

a clip storage compartment for storing clips within the body comprising a first end face and a second end face parallel to the first end face, the first and second end faces being perpendicular to a longitudinal axis of the clip storage compartment, a first direction being defined along the longitudinal axis from the second end face toward the first end face, a second direction being defined in a longitudinal direction opposite the first direction;

a presser moveably attached to the body for movement in a third direction perpendicular to the first direction and a fourth direction opposite the third direction;

a pusher located within the body and attached to the presser such that the pusher moves within the body in the third and fourth directions;

a tongue comprising two ends, one end of the tongue being attached to the pusher such that the tongue moves with the pusher in the third and fourth directions and moves relative to the pusher in the first and second directions and the other end of the tongue contacting a clip in position for dispensing from the clip storage compartment; and at least one clip exit groove within the body and adjacent to the first end face of the clip storage compartment for guiding a clip as the clip is dispensed in the third direction from the clip dispensing device;

wherein movement of the presser in the third direction moves the pusher and the tongue in the third direction and pushes the clip in position for dispensing from the clip storage compartment and through the at least one clip exit groove.

15. The clip dispensing device of claim 14, wherein the first end face of the clip storage compartment comprises a recess for receiving the tongue, the recess being deeper in the first direction than a thickness in the first direction of the tongue.

16. The clip dispensing device of claim 14, wherein the presser is pivotally attached to the body at a pivot point.

17. The clip dispensing device of claim 14, wherein the tongue is made of metal.

18. The clip dispensing device of claim 14, further comprising a first urging member which urges the pusher in the fourth direction relative to the body.

19. The clip dispensing device of claim 18, wherein the first urging member is a spring.

20. The clip dispensing device of claim 14, wherein a first clip exit groove directs a first portion of the clip being dispensed in the first and third directions simultaneously and a second clip exit groove directs a second portion of the clip being dispensed in the second and third directions simultaneously.

21. The clip dispensing device of claim 14, further comprising a platform for pushing at least one clip in the first direction toward the first end face of the clip storage compartment, the platform being located within the clip storage compartment and urged in the first direction by at least one urging member.

22. The clip dispensing device of claim 21, wherein the at least one urging member is a spring.

23. The clip dispensing device of claim 21, wherein the platform comprises:

an end face adjacent the first end face of the clip storage compartment; and a platform slot in the end face and having a size larger than the tongue;

wherein when no clips are in the clip storage compartment and the platform contacts the first end face of the clip storage compartment, the tongue moves within the platform slot to allow movement of the presser in the third direction.

* * * * *